(12) United States Patent
de Barsy

(10) Patent No.: US 7,341,082 B2
(45) Date of Patent: Mar. 11, 2008

(54) SHOULDER RIBS FOR PNEUMATIC TIRES

(75) Inventor: Olivier de Barsy, Eischen (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 184 days.

(21) Appl. No.: 11/024,083

(22) Filed: Dec. 28, 2004

(65) Prior Publication Data

US 2006/0137790 A1   Jun. 29, 2006

(51) Int. Cl.
*B60C 11/04* (2006.01)

(52) U.S. Cl. .................. 152/209.16; 152/209.18; 152/209.22; 152/901

(58) Field of Classification Search ............. 152/153, 152/209.12, 209.15, 209.16, 209.18, 209.22, 152/209.25, 900–901
See application file for complete search history.

(56) References Cited

U.S. PATENT DOCUMENTS

| | | | |
|---|---|---|---|
| 3,841,374 A | 10/1974 | Boileau | |
| 3,858,633 A | 1/1975 | Boileau | |
| 4,271,886 A | 6/1981 | Bachmann et al. | |
| 4,281,702 A | 8/1981 | Grosch et al. | |
| 4,567,929 A | 2/1986 | Els et al. ................ | 152/209 R |
| 5,097,882 A | 3/1992 | Adam et al. ............ | 152/209 R |
| 5,327,952 A | 7/1994 | Glover et al. ........... | 152/209 R |
| 5,616,195 A | 4/1997 | Marquet et al. ........ | 152/209 R |
| 5,660,652 A | 8/1997 | Young et al. ........... | 152/209 R |
| 6,220,321 B1 * | 4/2001 | Yoshioka et al. ...... | 152/209.22 |
| 6,298,890 B1 * | 10/2001 | Binsfeld ................ | 152/209.16 |
| 6,488,064 B1 | 12/2002 | Radulescu ............ | 152/209.14 |
| 6,564,839 B1 | 5/2003 | Manne et al. ......... | 152/209.14 |
| 6,705,367 B1 * | 3/2004 | Kobayashi ............ | 152/209.22 |
| 2003/0094227 A1 * | 5/2003 | Bettiol et al. .......... | 152/209.18 |

FOREIGN PATENT DOCUMENTS

| | | | |
|---|---|---|---|
| EP | 320143 | * | 6/1989 |
| JP | 60-179305 | * | 9/1985 |
| JP | 63-61606 | * | 3/1988 |
| JP | 09132007 | | 5/1997 |
| JP | 2000-108614 | * | 4/2000 |

OTHER PUBLICATIONS

European Patent Office, European Search Report from Corresponding European Application No. EP05112460 dated Apr. 3, 2006.

* cited by examiner

*Primary Examiner*—Steven D. Maki
(74) *Attorney, Agent, or Firm*—Wood, Herron & Evans, L.L.P.

(57) ABSTRACT

A pneumatic tire with a shoulder rib and lateral grooves defined in a shoulder rib. A tread and shoulder of the tire are joined along a shoulder edge. The tread includes a circumferential groove defining the shoulder rib, which is adjacent to the tire's shoulder. The lateral grooves, which intersect the shoulder edge, extend laterally across the shoulder rib, but do not intersect the circumferential groove.

9 Claims, 5 Drawing Sheets

US 7,341,082 B2

SHOULDER RIBS FOR PNEUMATIC TIRES

FIELD OF THE INVENTION

The present invention generally relates to pneumatic tires and, more particularly, to a pneumatic tire characterized by lateral grooves in the shoulder rib.

BACKGROUND OF THE INVENTION

Tires typically include a tread with a tread pattern that, when the tire is loaded, defines a footprint providing a frictional engagement with the road. Various tire constructions have been used to provide sufficient contact pressure at the shoulder during tire life while combating irregular wear and limiting heat generation in early life. However, these constructions have proven to be deficient in one regard or another.

One approach is to provide the shoulder rib with a step-off in which the whole shoulder rib is lowered relative to central tread regions. This construction, however, initiates irregular wear at an early mileage. Another approach is to use different types of decoupling grooves. Vertical decoupling grooves, which define a sacrificial shoulder rib, are prone to tearing that can propagate and result in shoulder rib tear. Side decoupling grooves are unproven and remain intact for most of the tire life, risking problems of fatigue at the deepest, rounded part. Dense shoulder blading is expensive, more so than molded grooves. Because shoulder blading is generally deep, it also increases the likelihood of crack formation.

For these and other reasons, it would be desirable to provide a pneumatic tire that addresses these and other deficiencies of typical pneumatic tires.

SUMMARY OF THE INVENTION

In one embodiment of the present invention, a pneumatic tire has a carcass with an axis of rotation, a sidewall centered about the axis of rotation, and a tread disposed radially outward of the carcass. The tread and sidewall are joined along an edge by a shoulder. The tread includes a circumferential groove defining a shoulder rib adjacent to the shoulder. The shoulder rib, which extends across an axial width of the tread, includes a plurality of lateral grooves intersecting the shoulder edge. These lateral grooves extend laterally across a portion of the axial width of the shoulder rib, but do not intersect the circumferential groove.

By virtue of the foregoing, there is provided an improved pneumatic tire that addresses various deficiencies of typical pneumatic tires. The tire of the present invention combines sufficient contact pressure at the shoulder during tire life to counteract irregular wear and to limit heat generation in early life. This is an especially acute problem with Very Low Aspect Ratio (VLAR) tires. However, all tires are impacted to some degree because nonskid depth (NSK) and/or heat generation are increased (to maximize treadwear potential (NSK) and as a side effect of increased wear resistance).

BRIEF DESCRIPTION OF THE DRAWINGS

The accompanying drawings, which are incorporated in and constitute a part of this specification, illustrate an embodiment of the invention and, together with a general description of the invention given above, and the detailed description given below, serve to explain the invention.

DEFINITIONS

Figure 1:
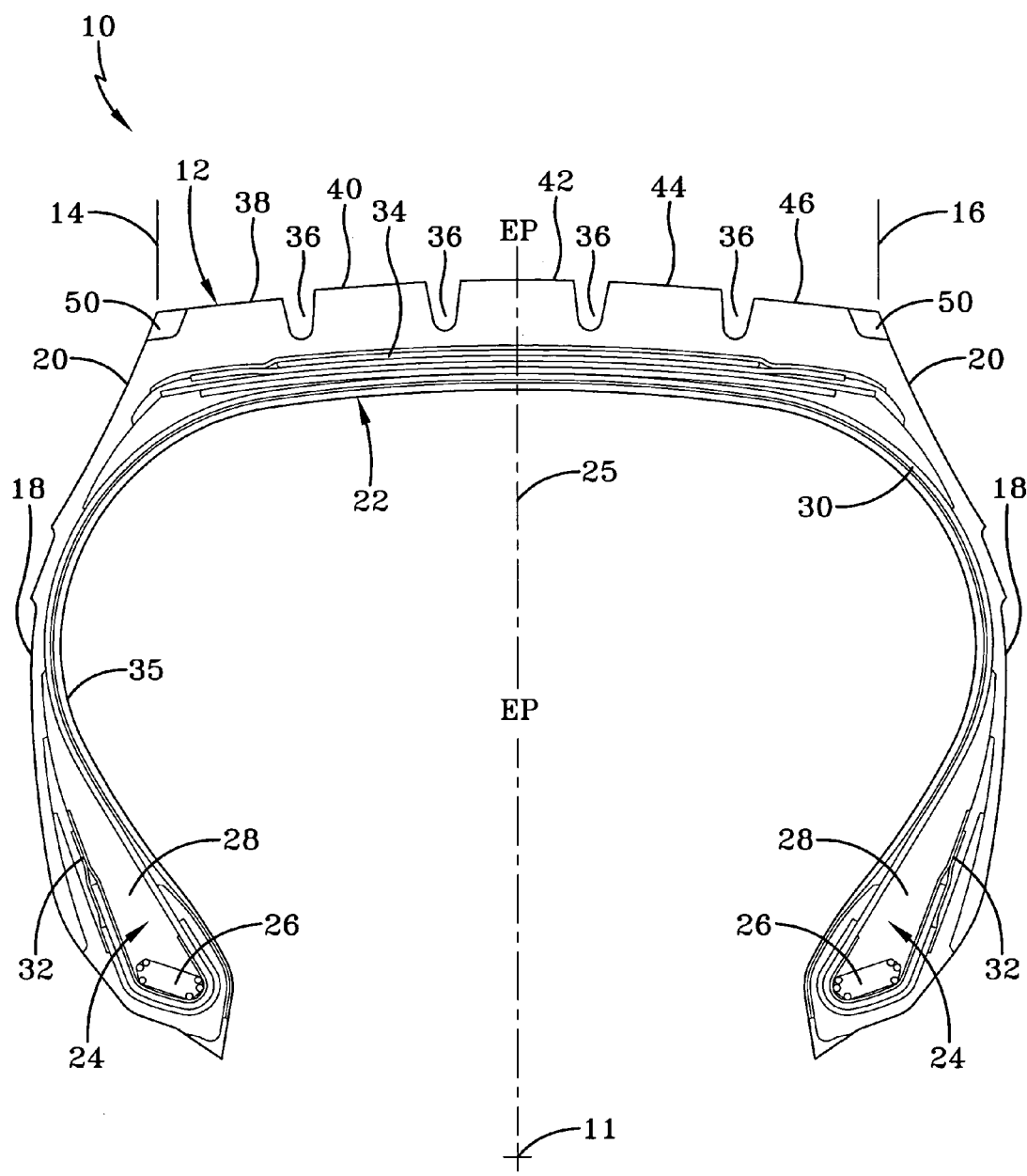
FIG. 1 is a cross-sectional view of a tire in accordance with the present invention.

"Apex" means an elastomeric filler located radially above the bead core and between the plies and the turnup ply.

"Axial" and "axially" mean the lines or directions that are parallel to the axis of rotation of the tire.

"Bead" means that part of the tire comprising an annular tensile member wrapped by ply cords and shaped to fit the design rim, with or without other reinforcement elements such as flippers, chippers, apexes, toe guards and chafers.

"Carcass" means the tire structure apart from the belt structure, tread, undertread, and sidewall rubber over the plies, but including the beads.

"Circumferential" means circular lines or directions extending along the surface of the sidewall perpendicular to the axial direction.

"Cord" means one of the reinforcement strands of which the plies in the tire are comprised.

"Cut belt or cut breaker reinforcing structure" means at least two cut layers of plies of parallel cords, woven or unwoven, underlying the tread, unanchored to the bead, and having both left and right cord angles in the range from 10 degrees to 33 degrees with respect to the equatorial plane of the tire.

"Equatorial plane (EP)" means the plane perpendicular to the tire's axis of rotation and passing through the center of its tread.

"Footprint" means the contact patch or area of contact of the tire tread with a flat surface at zero speed and under design load and pressure.

"Groove" means an elongated void area in a tread that may extend circumferentially or laterally about the tread in a straight, curved, or zig-zag manner. Grooves ordinarily remain open in the tire footprint.

"Lateral" means a direction parallel to the axial direction, as in across the width of the tread or crown region.

"Lateral edge" means the axially outermost edge of the tread as defined by a plane parallel to the equatorial plane and intersecting the outer ends of the axially outermost traction lugs at the radial height of the inner tread surface.

"Leading" refers to a portion or part of the tread that contacts the ground first, with respect to a series of such parts or portions, during rotation of the tire in the direction of travel.

"Nonskid" means depth of grooves in a tire tread.

"Normal inflation pressure" refers to the specific design inflation pressure and load assigned by the appropriate standards organization for the service condition for the tire.

"Normal load" refers to the specific design inflation pressure and load assigned by the appropriate standards organization for the service condition for the tire.

"Pneumatic tire" means a laminated mechanical device of generally toroidal shape, usually an open-torus having beads and a tread and made of rubber, chemicals, fabric and steel or other materials.

"Radial" and "radially" mean directions radially toward or away from the axis of rotation of the tire.

"Rib" means a circumferentially extending strip of rubber on the tread which is defined by at least one circumferential groove.

"Shoulder" means the upper portion of sidewall just below the tread edge.

"Sidewall" means that portion of a tire between the tread and the bead area.

"Sipes" refer to small slots molded into ribs of a tire that subdivide the tread surface and improve traction characteristics. Sipes tend to close completely in a tire footprint and constitute very narrow slots or slits formed by thin metal strips placed in the tire mold, referred to as sipe blades.

"Tire design load" is the base or reference load assigned to a tire at a specific inflation pressure and service condition; other load-pressure relationships applicable to the tire are based upon that base or reference load.

"Tread" means a molded rubber component which, when bonded to a tire casing, includes that portion of the tire that comes into contact with the road when the tire is normally inflated and under normal load.

"Tread width" means the arc length of the road contacting tread surface in the axial direction, that is, in a plane parallel to the axis of rotation of the tire.

"Tread Arc Width" (TAW) means the width of an arc having its center located on the equatorial plane (EP) and which substantially coincides with the radially outermost surfaces of the various traction elements (i.e., lugs, blocks, buttons, ribs, etc.) across the lateral or axial width of the tread portions of a tire (i.e., between the lateral edges of the tread) when the tire is mounted upon its designated rim and inflated to its specified inflation pressure but not subject to any load.

"Turn-up ply" refers to an end of a carcass ply that wraps around one bead only.

DETAILED DESCRIPTION

With reference to FIG. 1, a pneumatic tire 10 of the present invention includes a road-contacting tread 12 extending between lateral edges 14, 16, a pair of sidewalls 18 extending from the lateral edges 14, 16, respectively, a shoulder 20 defined at the juncture between each sidewall 18 and tread 12, and a carcass 22 defining a support structure for tire 10. The tread 12 and sidewalls 18 are comprised of a suitable material, such as a natural or synthetic rubber compound, selected in accordance with engineering standards accepted in the tire art. Tire 10 may have mirror symmetry for reflection about a mid-circumferential or equatorial plane 25 bisecting tire 10 midway between lateral edges 14, 16. Generally, the tire 10 includes an axis of rotation 11 that orthogonally intersects the equatorial plane 25.

The carcass 22 includes a pair of beads 24 each having an annular inextensible tensile member 26 and an apex 28. Each of the sidewalls 18 is terminated by a corresponding one of the beads 24, which provide support for the tire 10 and aid in sealing air in the tire 10. The carcass 22 further includes at least one composite ply structure 30 having opposite turn-up ply ends 32 each wrapped about one of the beads 24. Tire 10 further includes a belt package 34 typically characterized by a plurality of individual cut belt plies and/or spiral wound belt layers. The construction of the belt package 34 varies according to the tire construction. The plies of the ply structure 30 and the belt package 34 generally consist of cord reinforced elastomeric material in which the cords may be aramid, steel, fiberglass or polyamide and the elastomer is a vulcanized rubber material. The cord reinforced elastomeric material constituting the ply structure 30 and belt package 34 are encased in and bonded to a suitable material, such as a natural or synthetic rubber compound, selected in accordance with engineering standards accepted in the tire art.

A set of tires 10 is placed on a vehicle, such as an automobile. When each tire 10 is mounted on a rim and placed on the vehicle, the tread 12 protects the carcass 22 and belt package 34 while providing traction for the tire 10 on the road surface. Tire 10 contains an inflation fluid, like nitrogen, air, or another gas or gas mixture, that sustains the vehicle load. A liner 35, which may be formed of, for example, halobutyl rubber, defines an air impervious chamber for containing the air pressure when the tire 10 is inflated.

Figure 2:
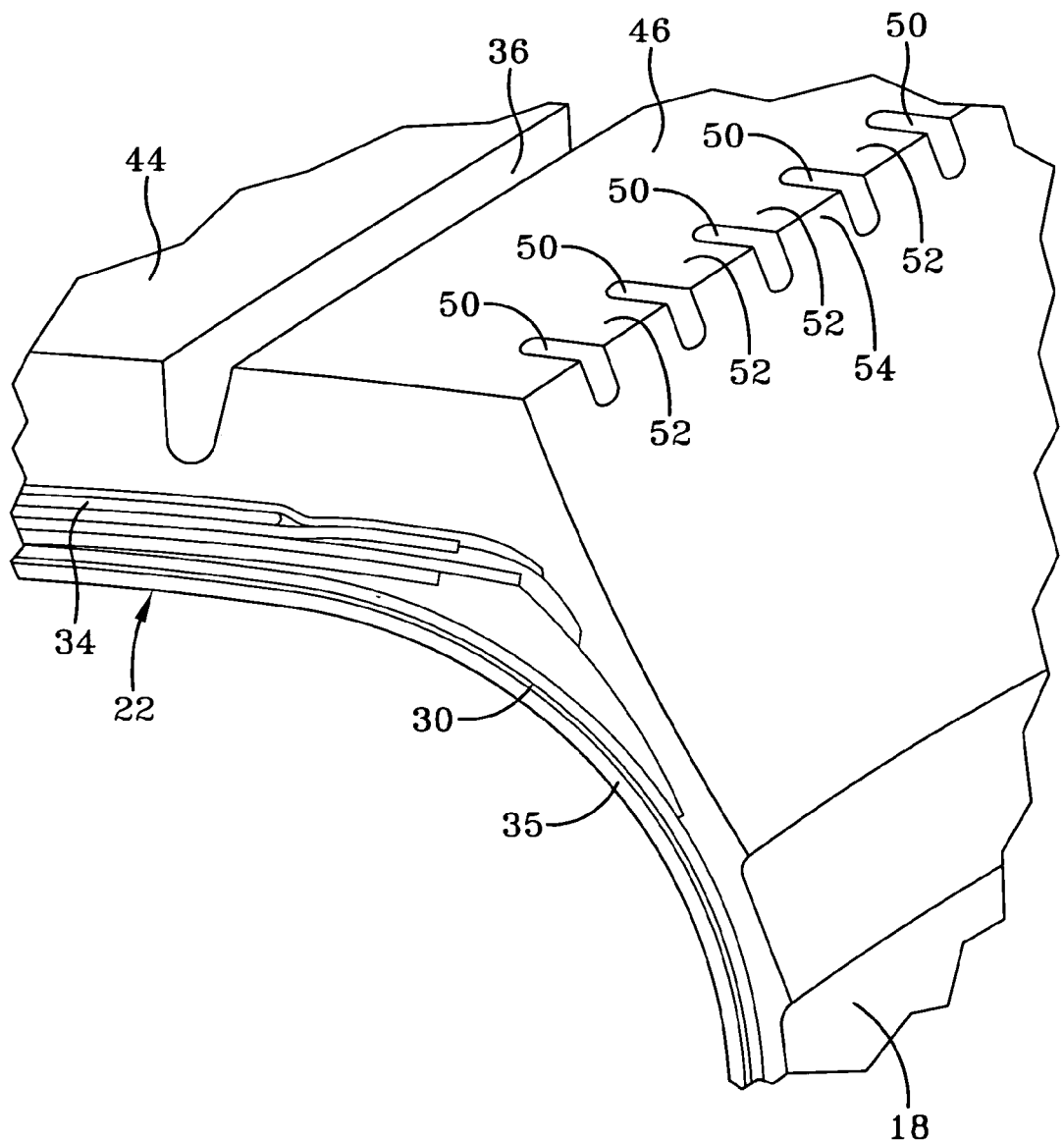
FIG. 2 is an enlarged fragmentary view of the tread of the tire of FIG. 1.

With reference to FIGS. 1 and 2, the tread 12 is partitioned by a plurality of continuous parallel circumferential grooves 36 into a plurality of ribs 38, 40, 42, 44, 46 that extend circumferentially about the tire 10. Any or all of the ribs 38, 40, 42, 44, 46 may further include additional lateral grooves (not shown) of a groove depth commensurate with the groove depth of the circumferential grooves 36 and that communicate with and intersect the circumferential grooves 36. Collectively, the circumferential grooves 36 and the lateral grooves define a relief pattern in any or all of the ribs 38, 40, 42, 44, 46 consisting of lugs or blocks.

The ribs 38, 46 nearest to each of the shoulders 20, or shoulder ribs, each include lateral grooves 50 that divide the shoulder rib 44 into a plurality of transversal ribs 52. The lateral grooves 50 may have a void-to-rubber ratio of around 50 percent, which is significantly greater than the void-to-rubber ratio of conventional sipes. The void-to-rubber ratio is evaluated across the axial dimension of the lateral grooves 50 and takes into account the rubber contained in the transversal ribs 52, which extend axially from a shoulder edge 54 to the termination of the lateral grooves 50. The void portion is equal to the volume of the lateral grooves 50 and the rubber portion is equal to the volume of the transversal ribs 52.

Sipes have a significantly lesser circumferential width and close completely in a tire footprint. In other words, the walls of the sipe contact with each other in the tire footprint, whereas the walls of the lateral grooves 50 do not contact in the tire footprint. Conventional sipes have a width less than 4 mm, which provides a void-to-rubber ratio for sipes that is significantly less than 50 percent. The lateral grooves 50 have a depth ranging from 2 mm to 25 percent to 35 percent of the non-skid depth of circumferential grooves 36 and have a width between the groove walls greater than 4 mm.

The depth profile of each of the lateral grooves 50 may not be uniform across the rib 38 or 46 and will generally, if non-uniform, increase toward the shoulder edge 54 defined at the intersection between tread 12 and shoulder 20, especially in the case of a very wide Tread Arc Width (TAW). In certain embodiments of the present invention, the maximum width of the resulting transversal ribs 52 may be equal to the depth of the lateral grooves 50. After an initial wear stage to a tread height less than the depth of lateral grooves 50, the shoulder rib 46 will have the appearance of a traditional solid shoulder rib. In other words, wear and ablation of the shoulder rib 46 eventually causes the lateral grooves 50 to vanish.

The lateral grooves 50 include a single transverse groove segment having a groove depth less than the depth of circumferential grooves 36. The lateral grooves 50 extend axially only across a portion of the shoulder rib 46 and do not extend across the full axial dimension of the shoulder rib 46. Consequently, the lateral grooves 50 do not intersect nor communicate with the adjacent circumferential groove 36. In other words, the lateral grooves 50 terminate within the shoulder rib 46, and have a closed end within the rib 46 and an open end defined at the shoulder edge 54. Each of the lateral grooves 50 intersects the shoulder edge 54. Lateral grooves 50 are oriented perpendicular to the equatorial plane 25 and circumferential groove 36. Similar lateral grooves 50 are provided in shoulder rib 38. However, ribs 40, 42, and 44 do not have lateral grooves similar to lateral grooves 50.

The transversal ribs 52 defined by lateral grooves 50 are prone to buckling, which reduces heat generation and the peak contact pressure of the new tire 10. The lateral grooves 50 may contribute to increased mileage due to rubber volume (wider TAW, higher NSK), increased mileage due to less irregular shoulder wear (high contact pressure) at high mileage, and increased durability (lower heat generation and temperature at the shoulder and, therefore, at the breaker edge).

Figure 3:
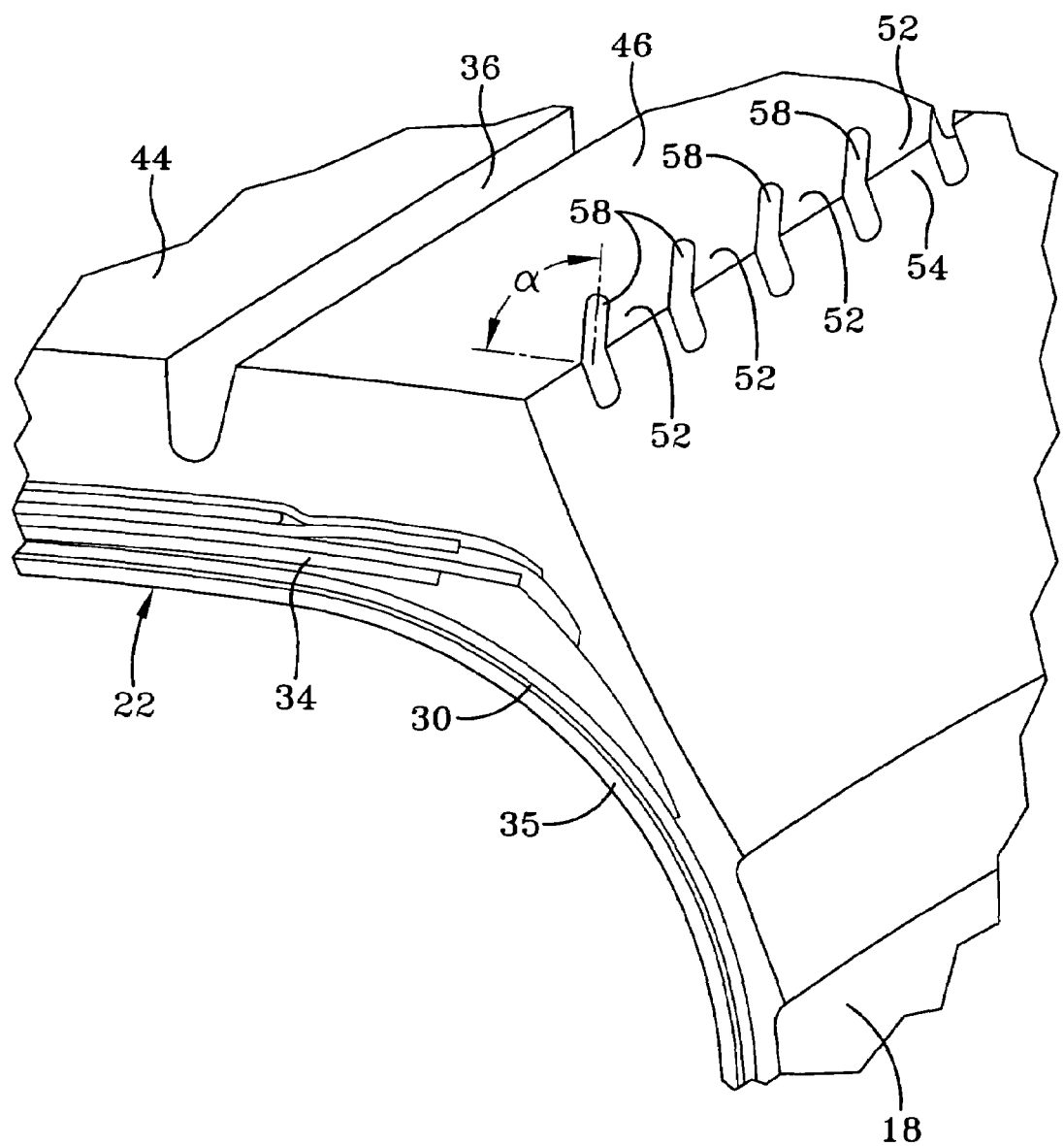
FIG. 3 is an enlarged fragmentary view similar to FIG. 2 depicting an alternative embodiment of a tire in accordance with the present invention.

With reference to FIG. 3 in which like reference numerals refer to like features in FIG. 2 and in accordance with an alternative embodiment of the present invention, the tire 10 may include lateral grooves 58 that are inclined relative to the axial direction and the equatorial plane 25 (FIG. 1). The lateral grooves 58 are inclined at an angle, a, measured relative to the equatorial plane 25 or, equivalently, the adjacent circumferential groove 36. Specifically, the lateral grooves 58 may be inclined at any acute angle relative to the equatorial plane 25 or adjacent circumferential groove 36. Other properties of the lateral grooves 58 are as described above for lateral grooves 50 (FIGS. 1 and 2).

Figure 4:
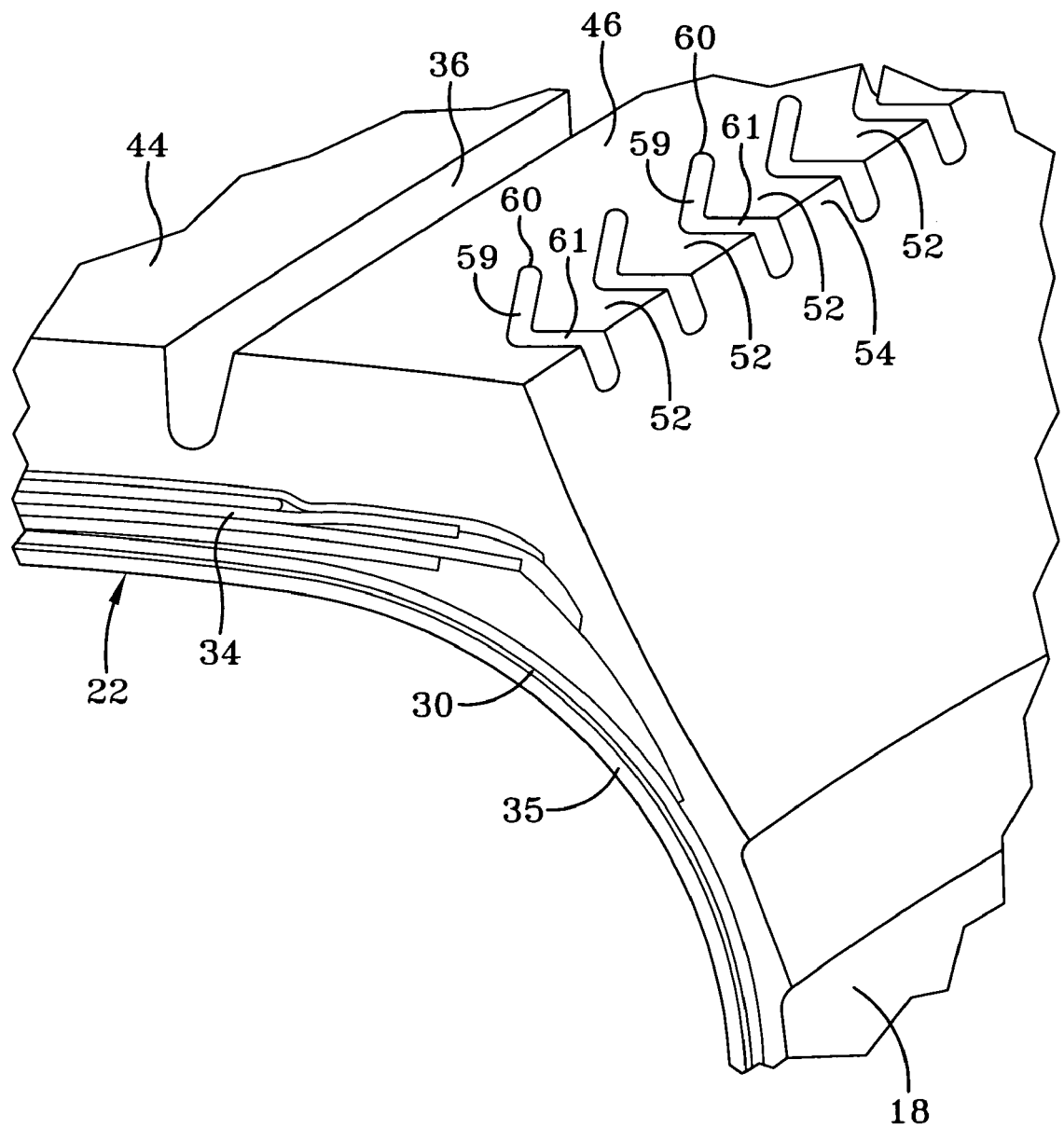
FIG. 4 is an enlarged fragmentary view similar to FIG. 2 depicting another alternative embodiment of a tire in accordance with the present invention.

With reference to FIG. 4 in which like reference numerals refer to like features in FIG. 2 and in accordance with an alternative embodiment of the present invention, the tire 10 may include lateral grooves 60 that have a zigzag or V-shaped appearance. Specifically, each of the lateral grooves 60 has a coupled pair of segments 59, 61 each inclined with a different acute inclination angle relative to the equatorial plane 25 (FIG. 1) or, equivalently, the adjacent circumferential groove 36. Each of the segments 59, 61 may be inclined with any acute angle, other than being oriented circumferentially. Other properties of the lateral grooves 60 are as described above for lateral grooves 50 (FIGS. 1 and 2). The segments 59, 61 intersect or meet so that the lateral grooves 60 are continuous.

Figure 5:
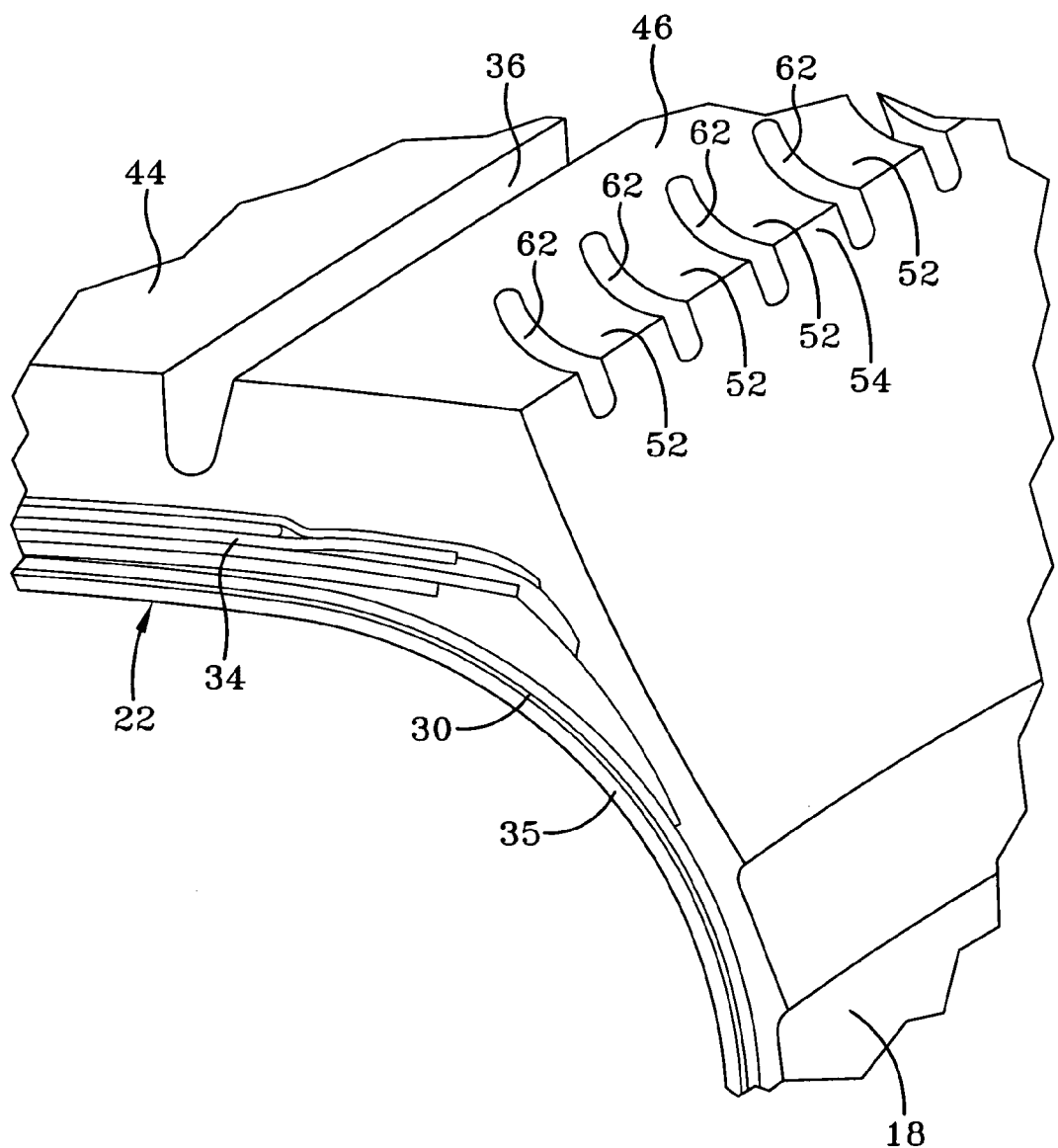
FIG. 5 is an enlarged fragmentary view similar to FIG. 2 depicting another alternative embodiment of a tire in accordance with the present invention.

With reference to FIG. 5 in which like reference numerals refer to like features in FIG. 2 and in accordance with an alternative embodiment of the present invention, the tire 10 may include lateral grooves 62 that are smoothly curved and, therefore, inclined with a continuously varying inclination angle measured relative to the equatorial plane 25 (FIG. 1). Other properties of the lateral grooves 62 are as described above for lateral grooves 50 (FIGS. 1 and 2), 58 (FIG. 3), and 60 (FIG. 4).

The invention contemplates that tire 10 may include a combination of the lateral grooves 50, 58, 60, and 62 consistent with the principles of the invention. For example, lateral grooves 50 and 58 may alternate about the circumference of at least one of the shoulder ribs 38 and 46.

While the invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. Thus, the invention in its broader aspects is therefore not limited to the specific details, representative apparatus and method, and illustrative examples shown and described. Accordingly, departures may be made from such details without departing from the spirit or scope of applicants' general inventive concept.

What is claimed is:

1. A pneumatic tire comprising:
a carcass having an axis of rotation;
a sidewall centered about said axis of rotation and having a shoulder; and
a tread disposed radially outward of said carcass and joined by said shoulder with said sidewall along a shoulder edge, said tread including a circumferential groove defining a first shoulder rib adjacent to said shoulder, said first shoulder rib extending across an axial width of said tread and including a plurality of lateral grooves intersecting said shoulder edge to define a plurality of transversal ribs, adjacent ones of said transversal ribs each having a first edge circumferentially aligned about the tire and defining a portion of the shoulder edge, said lateral grooves extending laterally across a portion of said axial width so that said lateral grooves do not intersect said circumferential groove,
wherein said lateral grooves each have a groove depth that is less than a groove depth of said circumferential groove and a void-to-rubber ratio of about 50 percent with respect to each of said transversal ribs.

2. The pneumatic tire of claim 1 wherein each of said lateral grooves is inclined at an angle relative to said circumferential groove.

3. The pneumatic tire of claim 1 wherein at least one of said lateral grooves is inclined at an angle relative to said circumferential groove.

4. The pneumatic tire of claim 1 wherein said groove depth of said lateral grooves ranges from 2 millimeters to 35 percent of said groove depth of said circumferential groove.

5. The pneumatic tire of claim 1 wherein each of said lateral grooves has a circumferential width greater than 4 millimeters.

6. The pneumatic tire of claim 1 wherein each of said lateral grooves includes a first groove segment inclined at a first angle relative to said circumferential groove and a second groove segment continuous with said first groove segment, said second groove segment inclined at a second angle relative to said circumferential groove that differs from said first angle.

7. The pneumatic tire of claim 1 wherein each of said lateral grooves is lengthwise continuously curved in an axial direction.

8. The pneumatic tire of claim 1 wherein each of said lateral grooves has a groove depth that is non-uniform across an axial dimension.

9. The pneumatic tire of claim 8 wherein said groove depth increases in a direction toward said shoulder edge.

* * * * *

UNITED STATES PATENT AND TRADEMARK OFFICE
Certificate

Patent No. 7,341,082 B2            Patented: March 11, 2008

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Olivier de Barsy, Eischen (LU); and Gia-Van Nguyen, Blagny (FR).

Signed and Sealed this Twenty-eighth day of December 2010.

RICHARD CRISPINO
*Supervisory Patent Examiner*
Art Unit 1747
Technology Center 1700